United States Patent
Suzuki et al.

(10) Patent No.: US 7,343,088 B2
(45) Date of Patent: Mar. 11, 2008

(54) DISC APPARATUS, DISC RECORDING METHOD, DISC PLAYBACK METHOD, RECORDING MEDIUM, AND PROGRAM

(75) Inventors: Takao Suzuki, Kanagawa (JP); Ichiro Tanji, Kanagawa (JP)

(73) Assignee: Sony Corporation, Tokyo (JP)

( * ) Notice: Subject to any disclaimer, the term of this patent is extended or adjusted under 35 U.S.C. 154(b) by 786 days.

(21) Appl. No.: 10/792,000

(22) Filed: Mar. 3, 2004

(65) Prior Publication Data

US 2004/0223739 A1 Nov. 11, 2004

(30) Foreign Application Priority Data

Mar. 4, 2003 (JP) .............................. 2003-057321

(51) Int. Cl.
*H04N 5/00* (2006.01)
(52) U.S. Cl. ..................................................... 386/125
(58) Field of Classification Search ...................... None
See application file for complete search history.

(56) References Cited

U.S. PATENT DOCUMENTS

| | | |
|---|---|---|
| 3,939,825 A | 2/1976 | Krummenacher |
| 4,075,457 A | 2/1978 | Williams |
| 4,086,669 A | 5/1978 | Combis |
| 4,497,313 A | 2/1985 | Kurosawa |
| 4,620,529 A | 11/1986 | Kurosawa |
| 4,742,456 A | 5/1988 | Kamena |
| 4,979,245 A | 12/1990 | Gandinia |
| 5,224,224 A | 7/1993 | Hintz et al. |
| 5,729,841 A | 3/1998 | Chan |
| 5,838,874 A | 11/1998 | Ng et al. |
| 5,862,545 A | 1/1999 | Mathis et al. |
| 6,112,226 A * | 8/2000 | Weaver et al. .............. 709/203 |
| 6,167,088 A | 12/2000 | Sethuraman |
| 6,199,224 B1 | 3/2001 | Versland |
| 6,357,060 B2 | 3/2002 | Gloodt |
| 2003/0174549 A1* | 9/2003 | Yaguchi et al. .............. 365/200 |

FOREIGN PATENT DOCUMENTS

| | | |
|---|---|---|
| EP | 0 964 578 | 12/1999 |
| JP | 8 237612 | 9/1996 |
| JP | 9 168148 | 6/1997 |
| JP | 2002 27461 | 1/2002 |

* cited by examiner

*Primary Examiner*—John Miller
*Assistant Examiner*—Heather R. Jones
(74) *Attorney, Agent, or Firm*—Frommer Lawrence & Haug LLP; William S. Frommer

(57) ABSTRACT

A table which includes entries corresponding to frames in one-to-one relationship is generated. Information of each frame is described in each entry according to a display order. When video data has a frame rate of 24 frames/sec, a dummy entry is inserted for every four frames. A top_field_first flag, a repeat_first_field flag, and a picture type flag are described in each entry. A frame to be displayed is generated based on these flags. The present invention can be applied to an optical disc apparatus.

18 Claims, 19 Drawing Sheets

FIG. 10

| FRAME (PICTURE) NUMBER IN DISPLAY ORDER | top_field_first | repeat_first_field | picture type (01: I picture, 10: P picture, 11: B picture, 00: D (dummy)) | size / File Address |
|---|---|---|---|---|
| #0 | 0 | 0 | B | size |
| #1 | 0 | 0 | B | ⋯ |
| #2 | 0 | 0 | I | ⋯ |
| #3 | 0 | 0 | B | ⋯ |
| #4 | 0 | 0 | B | ⋯ |
| #5 | 0 | 0 | P | ⋯ |
| #6 | 0 | 0 | B | ⋯ |
| #7 | 0 | 1 | B | ⋯ |
| #8 ← PLAYBACK OF THIS FRAME IS INSTRUCTED | 1 | 1 | (P) | file_address_1 / file_address_2 |
| #9 | 0 | 0 | B | ⋯ |
| #10 | 0 | 0 | B | ⋯ |
| ⋮ | | | ⋮ | ⋮ |
| #n | | | P | ⋯ |

FIG. 11

| top_field_first | repeat_first_field | picture type | PROCESS |
|---|---|---|---|
| 0 | 0 | — | Display frame made by combining top field and bottom field of picture indicated by File Address of the entry in table. |
| 1 | 0 | — | Display frame made by combining top field and bottom field of picture indicated by File Address of the entry in table. |
| 0 | 1 | — | Display frame made by combining top field of picture indicated by File Address of the immediately preceding entry in table and bottom field of picture indicated by File Address of the entry in table. |
| 1 | 1 | — | Display frame made by combining top field of picture indicated by File Address of the entry in table and bottom field of picture indicated by File Address of the immediately preceding entry in table. |
| (don't care) | — | dummy picture | Display frame made by combining top field and bottom field of picture indicated by File Address of the immediately preceding entry in table. |

FIG. 13

| DISPLAYED VIDEO FRAME NUMBER (30 FRAMES/SEC) | 1 | 2 | 3 | 4 | 5 |
|---|---|---|---|---|---|
| top_field_first | 0 | 1 | 0 | 1 | |
| repeat_first_field | 0 | 0 | 1 | 1 | |
| picture type | | | | | DUMMY |
| FRAME RECORDED ON DISC (24 FRAMES/SEC) | A | B | C | D | |

| RECORDED PICTURE USED FOR FORMING PLAYBACK PICTURE | A | | B | | C | | D | |
|---|---|---|---|---|---|---|---|---|
| Top/Bottom field | T | B | B | T | B | T | B | T | B |

FIG. 14

| | | | | | picture type | 01: I picture<br>10: P picture<br>11: B picture | | | |
|---|---|---|---|---|---|---|---|---|---|
| | | | | | 1: dummy picture<br>0: others | | | | |

| | | | File Address |
|---|---|---|---|
| 0 | B | ... | |
| 0 | B | ... | |
| 0 | I | ... | |
| 0 | B | ... | |
| 1 | | 0x0000000000 | |
| 0 | B | ... | |
| 0 | P | ... | |
| 0 | B | ... | |
| 0 | B | ... | |
| 1 | | 0x0000000000 | |
| 0 | P | ... | |
| 0 | .. | ... | |
| 0 | .. | ... | |
| 0 | P | ... | |

| 1: GOP top, 0: others | | | |
|---|---|---|---|
| | top_field_first | | |
| | | repeat_first_field | |

| | | | size | |
|---|---|---|---|---|
| 0 | 0 | | ... | #0 |
| 0 | 1 | | ... | #1 |
| 1 | 0 | | ... | #2 |
| 1 | 1 | | ... | #3 |
| | | | | #4 |
| 0 | 0 | | ... | #5 |
| 0 | 1 | | ... | #6 |
| 1 | 0 | | ... | #7 |
| 1 | 1 | | ... | #8 |
| | | | | #9 |
| 0 | 0 | | | #10 |
| | | | | .. |
| | | | | .. |
| | | | | #n |

DISC APPARATUS, DISC RECORDING METHOD, DISC PLAYBACK METHOD, RECORDING MEDIUM, AND PROGRAM

BACKGROUND OF THE INVENTION

1. Field of the Invention

The present invention relates to a disc apparatus, disc recording method, disc playback method, recording medium, and program. In particular, the present invention relates to a disc apparatus, disc recording method, disc playback method, recording medium, and program, for enabling an easy access to a frame which is played back at a frame rate different from that of recording.

2. Description of the Related Art

The frame rate of a video signal in the NTSC scheme is 30 frames/sec, whereas the frame rate of a cinema film is 24 frames/sec.

Pictures having a frame rate of 30 frames/sec and pictures having a frame rate of 24 frames/sec may be edited so as to be combined, and the obtained pictures may be recorded on a disc as a piece of video data (for example, see Patent Document 1: Japanese Unexamined Patent Application Publication No. 9-168148).

When video data including pictures of a frame rate of 30 frames/sec and pictures of a frame rate of 24 frames/sec is recorded on a disc and when the video data is played back from the disc, a playback apparatus plays back the video data at a frame rate of 30 frames/sec, because the NTSC format is used as the standard in this country.

If pictures of a frame rate of 24 frames/sec are played back at a frame rate of 30 frames/sec, the pictures are fast-forwarded because the pictures of 24 frames, which should be played back for 1 second, are played back for 24/30 seconds. Therefore, a so-called 3-2 pull-down processing for converting the pictures of 24 frames/sec to pictures of 30 frames/sec is performed.

Normally, a user recognizes that pictures are played back at a frame rate of 30 frames/sec. Therefore, when the user specifies a frame number so as to search for a predetermined frame, he/she specifies a frame to be searched for while regarding that the number of displayed frames corresponds to frame numbers.

For example, the user specifies a frame No. 100. In this case, if the number of frames of pictures recorded on a disc is counted and if a picture having a frame rate of 24 frames/sec exists among the frames No. 1 to No. 100, the frame number which is actually displayed is smaller than 100. As a result, a frame having the number specified by the user cannot be searched for.

SUMMARY OF THE INVENTION

The present invention has been made in view of these circumstances, and it is an object of the present invention to provide an apparatus in which a frame required by a user can be reliably searched for.

According to a first aspect of the present invention, a disc apparatus includes: a determining unit for determining, for each frame of video data, whether the first field of the frame is a top field, whether the frame includes a repeat field, and whether the frame is a dummy frame; a generating unit for generating a table based on the determination result from the determining unit, the table including pieces of identification information of each frame: identification information indicating whether the first field of the frame is a top field, identification information indicating whether the frame includes a repeat field, and identification information indicating whether the frame is a dummy frame; and a recording unit for recording the generated table on the disc.

The determining unit may also determine the type of encoding of the frame, and the generating unit may describe identification information indicating the type of encoding of the frame in the table.

Preferably, the unit of the encoding is a long Group Of Pictures, the identification information indicating whether the first field of the frame is a top field is top_field_first, the identification information indicating whether the frame includes a repeat_field is repeat_first_field, and the type of encoding of the frame includes I picture, P picture, and B picture.

The generating unit may describe an address indicating the position on the disc of the frame in the table.

The generating unit may allocate a uniform size of entry of the table to each frame, and may describe the identification information of each frame in the entries of the table according to a display order.

The generating unit may generate the table for each unit of recording including sequential pieces of the video data, and, when part of the video data is deleted, the generating unit may delete part of the table corresponding to the deleted part of the video data.

The generating unit may also generate an offset value indicating a position from the top of the table, and the recording unit may record the offset value on the disc.

According to a second aspect of the present invention, a disc recording method includes: a determining step of determining, for each frame of video data, whether the first field of the frame is a top field, whether the frame includes a repeat field, and whether the frame is a dummy frame; a generating step of generating a table based on the determination result obtained in the determining step, the table including pieces of identification information of each frame: identification information indicating whether the first field of the frame is a top field, identification information indicating whether the frame includes a repeat field, and identification information indicating whether the frame is a dummy frame; and a recording step of recording the generated table on the disc.

According to a third aspect of the present invention, a program recorded in a recording medium includes: a determining step of determining, for each frame of video data, whether the first field of the frame is a top field, whether the frame includes a repeat field, and whether the frame is a dummy frame; a generating step of generating a table based on the determination result obtained in the determining step, the table including pieces of identification information of each frame: identification information indicating whether the first field of the frame is a top field, identification information indicating whether the frame includes a repeat field, and identification information indicating whether the frame is a dummy frame; and a recording step of recording the generated table on the disc.

According to a fourth aspect of the present invention, a program allows a computer to execute: a determining step of determining, for each frame of video data, whether the first field of the frame is a top field, whether the frame includes a repeat field, and whether the frame is a dummy frame; a generating step of generating a table based on the determination result obtained in the determining step, the table including pieces of identification information of each frame: identification information indicating whether the first field of the frame is a top field, identification information indicating whether the frame includes a repeat field, and identification information indicating whether the frame is a dummy frame; and a recording step of recording the generated table on the disc.

According to a fifth aspect of the present invention, a disc apparatus includes: a playback unit for playing back video data and a table from a disc, the table including pieces of identification information of each frame of the video data: identification information indicating whether the first field of the frame is a top field, identification information indicating whether the frame includes a repeat field, and identification information indicating whether the frame is a dummy frame; a frame generating unit for generating a frame to be displayed based on the identification information in the played back table; and an output unit for decoding video data of the generated frame and outputting the video data.

Further, identification information indicating the type of encoding of the frame may be described in the table.

Preferably, the unit of the encoding is a long Group Of Pictures, the identification information indicating whether the first field of the frame is a top field is top_field_first, the identification information indicating whether the frame includes a repeat field is repeat_first_field, and the identification information indicating the type of encoding of the frame is a signal for identifying the frame as I picture, P picture, or B picture.

The disc apparatus may further include a searching unit for determining the type of a specified playback-starting-frame based on the identification information indicating the type of encoding of the frame, and, when the specified playback-starting-frame is not I picture, searching for the temporally preceding nearest I picture. The output unit may start decoding from the searched I picture and output the video data from the specified frame.

An address indicating the position on the disc of the frame may be described in the table.

The identification information of each frame may be described in the table in accordance with a display order, and the searching unit may compute the position on the table of the specified frame based on the size of an entry of the table allocated to the frame and a specified-frame number.

An offset value indicating a position from the top of the table may be described in the table, and the searching unit may compute the position on the table of the specified frame by using the offset value.

According to a sixth aspect of the present invention, a disc playback method includes: a playback step of playing back video data and a table from a disc, the table including pieces of identification information of each frame of the video data: identification information indicating whether the first field of the frame is a top field, identification information indicating whether the frame includes a repeat field, and identification information indicating whether the frame is a dummy frame; a frame generating step of generating a frame to be displayed based on the identification information in the played back table; and an output step of decoding video data of the generated frame and outputting the video data.

According to a seventh aspect of the present invention, a program recorded in a recording medium includes: a playback step of playing back video data and a table from a disc, the table including pieces of identification information of each frame of the video data: identification information indicating whether the first field of the frame is a top field, identification information indicating whether the frame includes a repeat field, and identification information indicating whether the frame is a dummy frame; a frame generating step of generating a frame to be displayed based on the identification information in the played back table; and an output step of decoding video data of the generated frame and outputting the video data.

According to an eighth aspect of the present invention, a program allows a computer to execute: a playback step of playing back video data and a table from a disc, the table including pieces of identification information of each frame of the video data: identification information indicating whether the first field of the frame is a top field, identification information indicating whether the frame includes a repeat field, and identification information indicating whether the frame is a dummy frame; a frame generating step of generating a frame to be displayed based on the identification information in the played back table; and an output step of decoding video data of the generated frame and outputting the video data.

According to the first to fourth aspects of the present invention, a table including: identification information indicating whether the first field of the frame is a top field; identification information indicating whether the frame includes a repeat field; and identification information indicating whether the frame is a dummy frame, is recorded on a disc. Accordingly, a disc apparatus enabling a precise access to an arbitrary frame can be realized. In particular, even when video data which is played back at a frame rate different from that at recording is mixed with video data which is played back at the same frame rate as recording, a precise and quick access to an arbitrary frame can be realized.

According to the fifth to eighth aspects of the present invention, a table is played back from a disc, and a frame to be displayed is generated based on the identification information indicating whether the first field of the frame is a top field; identification information indicating whether the frame includes a repeat field; and identification information indicating whether the frame is a dummy frame, which are described in the table. Accordingly, an access to an arbitrary frame can be realized. In particular, even when video data which is displayed at a frame rate different from that at recording is mixed with video data which is played back at the same frame rate as recording, a precise and quick access to an arbitrary frame can be realized.

BRIEF DESCRIPTION OF THE DRAWINGS

FIG. 10 illustrates an example of searching for I picture;

FIG. 11 illustrates flags used for a process of specifying a frame to be displayed;

FIG. 13 shows a specific example of the process of specifying a frame to be displayed;

FIG. 14 shows another example of the table;

DESCRIPTION OF THE PREFERRED EMBODIMENT

Figure 1:
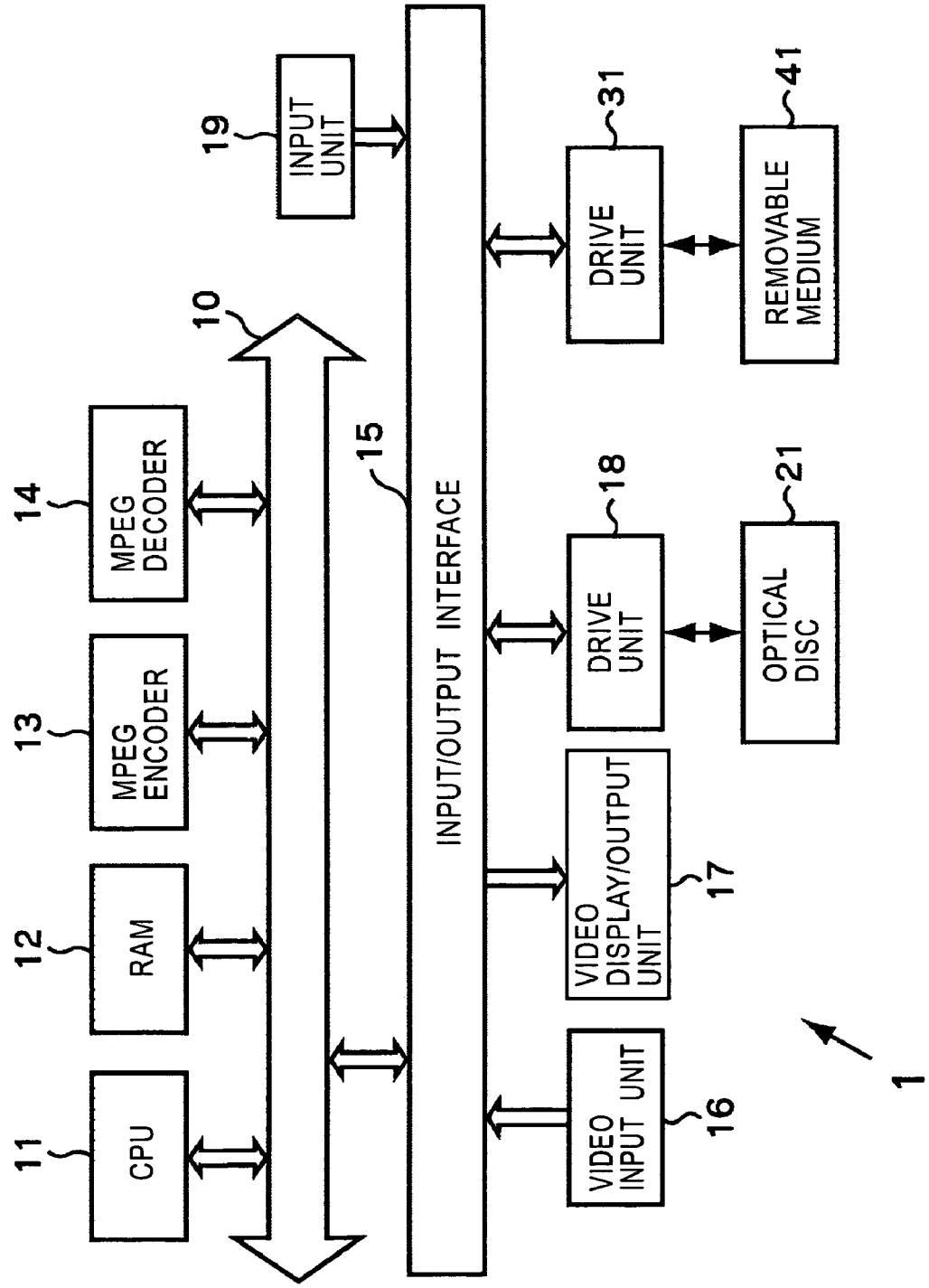
FIG. 1 is a block diagram showing an example of the configuration of a disc recording/playback apparatus of the present invention.

FIG. 1 shows the configuration of a disc recording/playback apparatus 1 according to the present invention. The disc recording/playback apparatus 1 includes a central processing unit (CPU) 11 for controlling the operation of each unit. A random access memory (RAM) 12 stores programs executed by the CPU 11 and various types of data as necessary. A Moving Picture Experts Group (MREG) encoder 13 encodes video data by the MPEG method. An MPEG decoder 14 decodes video data encoded by the MPEG method.

A video input unit 16, a video display/output unit 17, a drive unit 18, and an input unit 19 are connected to an input/output interface 15. The video input unit 16 inputs video data encoded by the MPEG method or analog/digital video data which is not encoded. The video display/output unit 17 processes video data decoded by the MPEG decoder 14 and outputs the video data to a display (not shown), such as a liquid crystal display (LCD) or a cathode ray tube (CRT), so as to display the video data.

The drive unit 18 records video data on a loaded optical disc 21 and plays back recorded video data. The input unit 19 inputs commands from a user.

The input/output interface 15 is connected to the CPU 11, the RAM 12, the MPEG encoder 13, and the MPEG decoder 14 through a bus 10.

Further, a drive unit 31 is connected to the input/output interface 15 as necessary. The drive unit 31 downloads a program recorded on a loaded removable medium 41.

Although not shown, the disc recording/playback apparatus 1 has a function of recording audio data on the optical disc 21 and playing back the audio data.

Figure 2:
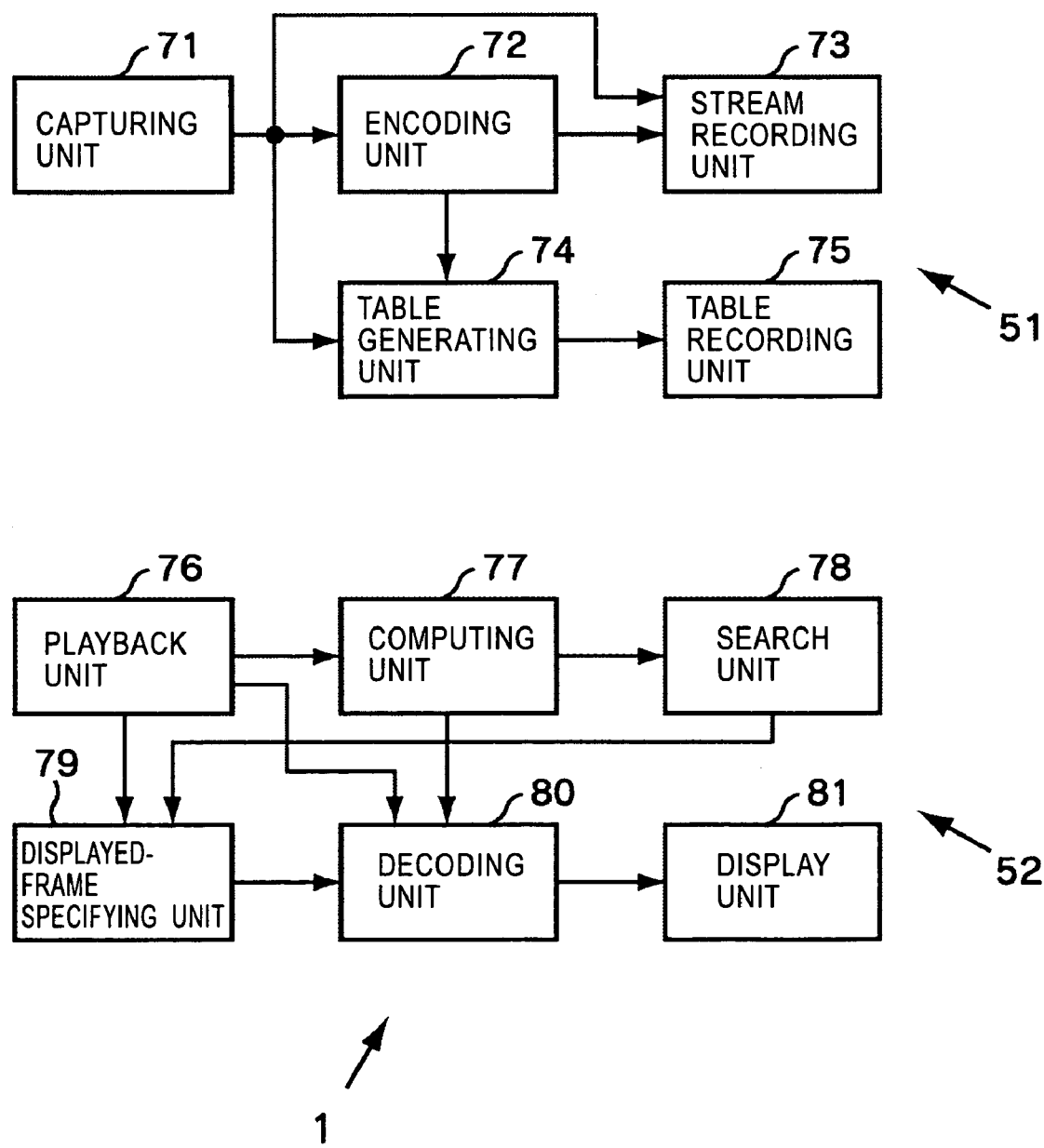
FIG. 2 is a block diagram showing a functional structure of the disc recording/playback apparatus shown in FIG. 1.

FIG. 2 shows an example of a functional structure in which the CPU 11 executes each process according to a program. The disc recording/playback apparatus 1 basically includes a recording system 51 and a playback system 52. The recording system 51 includes a capturing unit 71, an encoding unit 72, a stream recording unit 73, a table generating unit 74, and a table recording unit 75. The capturing unit 71 captures video data input by the video input unit 16 and supplies the video data to the encoding unit 72, the table generating unit 74, and the stream recording unit 73. The encoding unit 72 corresponds to the MPEG encoder 13 and encodes the video data supplied from the capturing unit 71 by the MPEG method. The stream recording unit 73 supplies a stream which has been encoded by and output from the encoding unit 72 to the drive unit 18 so as to allow the optical disc 21 to record the stream thereon.

The table generating unit 74 generates a table used for accessing the video data in units of frames based on the video data supplied from the capturing unit 71 and outputs the table to the table recording unit 75. The table recording unit 75 records the table generated by the table generating unit 74 on the optical disc 21 through the drive unit 18.

The playback system 52 includes a playback unit 76, a computing unit 77, a search unit 78, a displayed-frame specifying unit 79, a decoding unit 80, and a display unit 81.

The playback unit 76 corresponds to the drive unit 18 and plays back video data and table recorded on the optical disc 21. The computing unit 77 computes the position on the table corresponding to a specified frame by using the played back table. The search unit 78 searches for the nearest I picture which precedes the frame specified by a user based on the position on the table computed by the computing unit 77. Also, the search unit 78 supplies position information indicating the position on the table of the I picture to the displayed-frame specifying unit 79.

The data of the table played back by the playback unit 76 is supplied to the displayed-frame specifying unit 79. The displayed-frame specifying unit 79 specifies a frame to be displayed based on the I picture on the table and outputs the processing result to the decoding unit 80. The video data played back by the playback unit 76 is also supplied to the decoding unit 80. The decoding unit 80, which corresponds to the MPEG decoder 14, decodes the video data by the MPEG method and outputs it to the display unit 81. The display unit 81, which corresponds to the video display/output unit 17, outputs the video data supplied from the decoding unit 80 to the CRT or LCD so as to display the video data.

Figure 3:
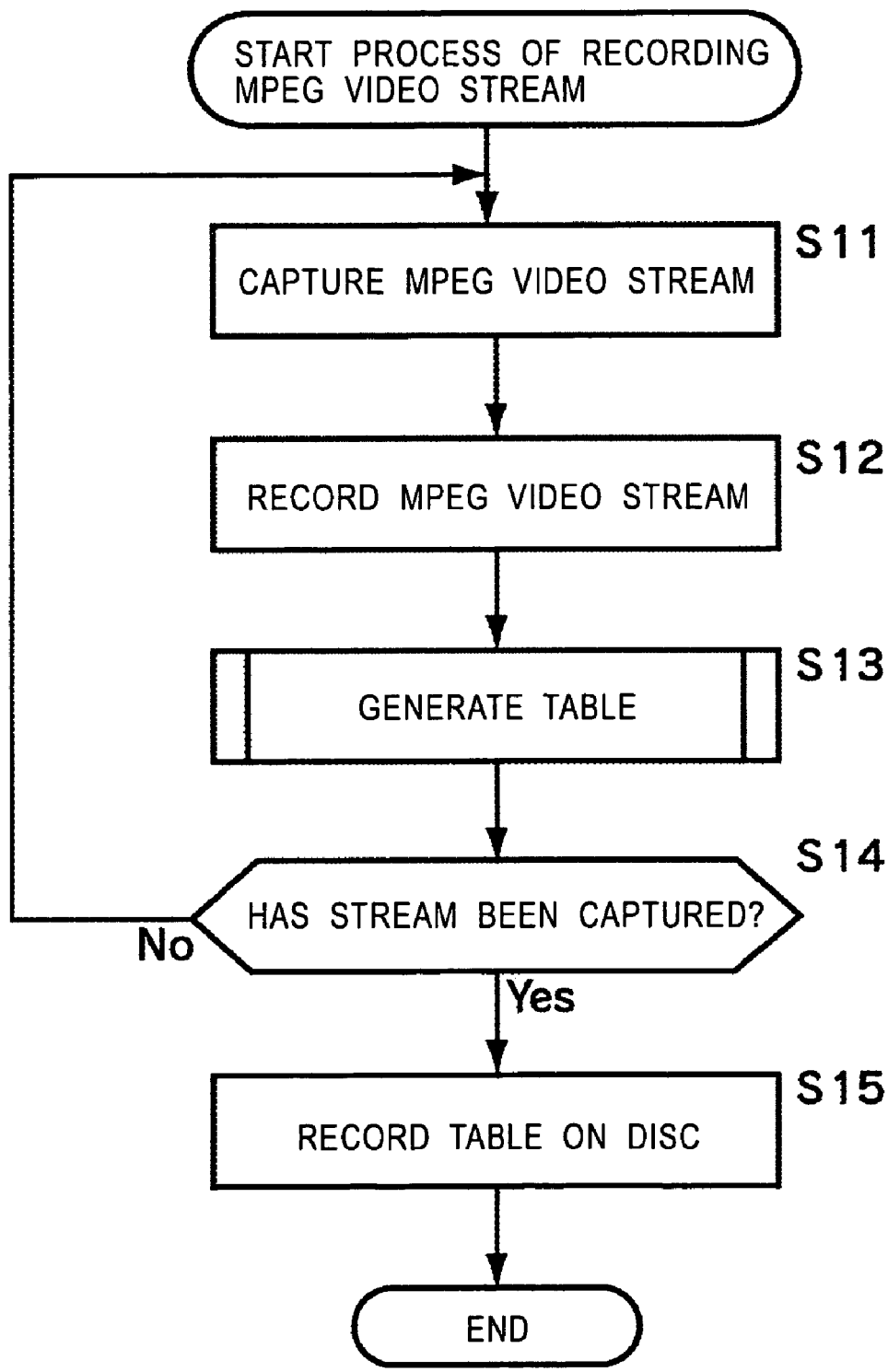
FIG. 3 is a flowchart illustrating a process of recording an MPEG video stream in the disc recording/playback apparatus shown in FIG. 2.

Next, a process of recording an encoded MPEG stream on the optical disc 21 by the MPEG method will be described with reference to the flowchart shown in FIG. 3.

First, in step S11, the capturing unit 71 captures a video data stream input by the video input unit 16. If the input video data stream has already been encoded by the MPEG method, the capturing unit 71 supplies it to the stream recording unit 73. Then, in step S12, the stream recording unit 73 supplies the input video data stream to the optical disc 21 so as to record the stream thereon.

Figure 4:
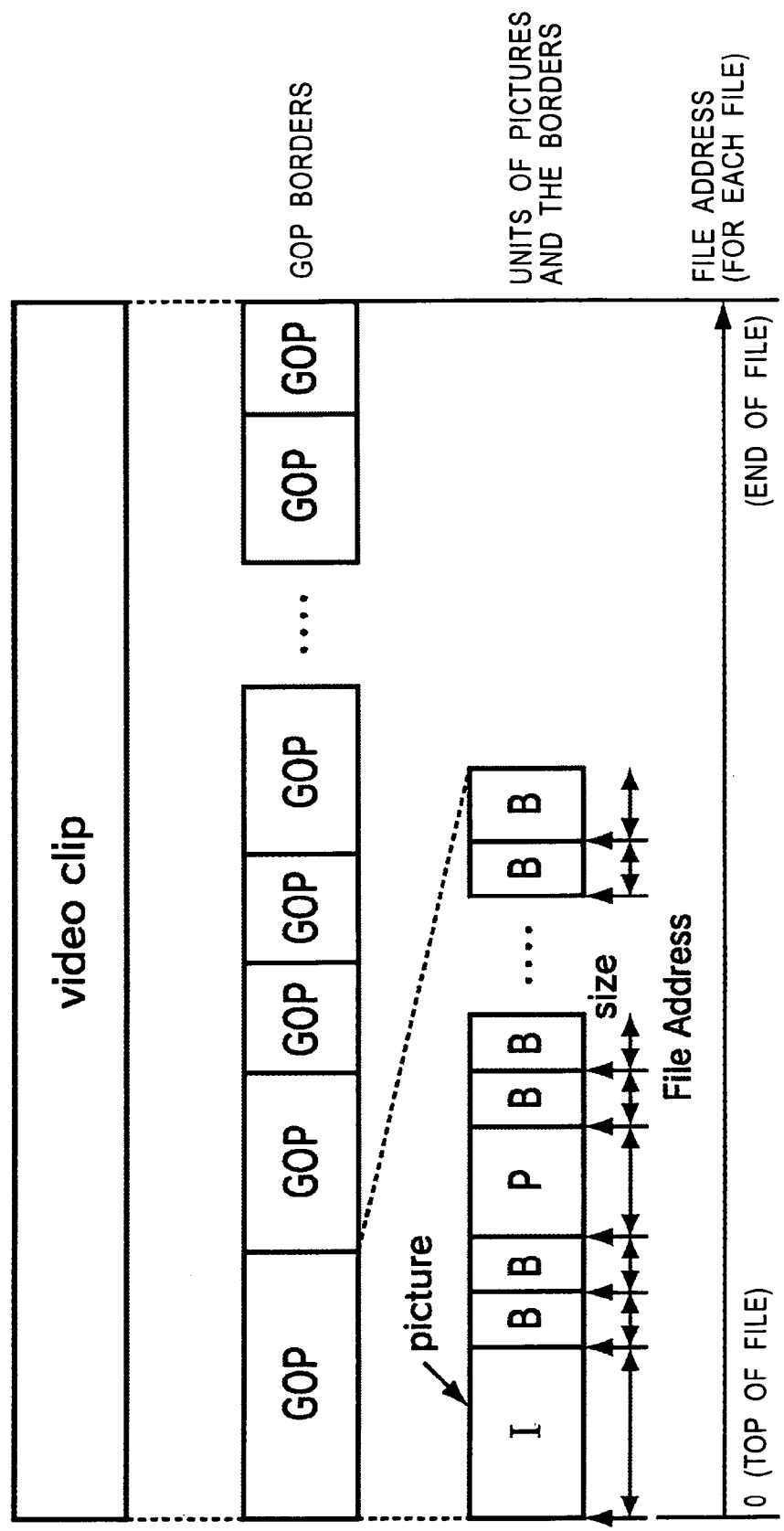
FIG. 4 shows the configuration of a video clip.

FIG. 4 shows the format of the video data stream recorded on the optical disc 21 in this way.

As shown in FIG. 4, a video clip (unit of recording) including sequential pieces of video data is encoded in units of GOPs (Group Of Pictures). The GOP is regarded as a long GOP, and each GOP includes, for example, 15 frames of pictures.

Each frame forms a picture, and each picture is encoded as I picture, P picture, or B picture. I picture is encoded by intraframe coding, and thus its data amount is the largest. P picture is encoded by interframe prediction based on temporally preceding I picture or P picture. The data amount of P picture is smaller than that of I picture.

B picture is encoded by interframe prediction based on temporally before/after I picture or P picture, and the data amount thereof is the smallest.

The data amount of each picture, that is, the data amount of each GOP, changes depending on the complexity of the picture. Therefore, the data amount of video clips differs from each other. One video clip is recorded as one file on the optical disc 21.

Figure 5:
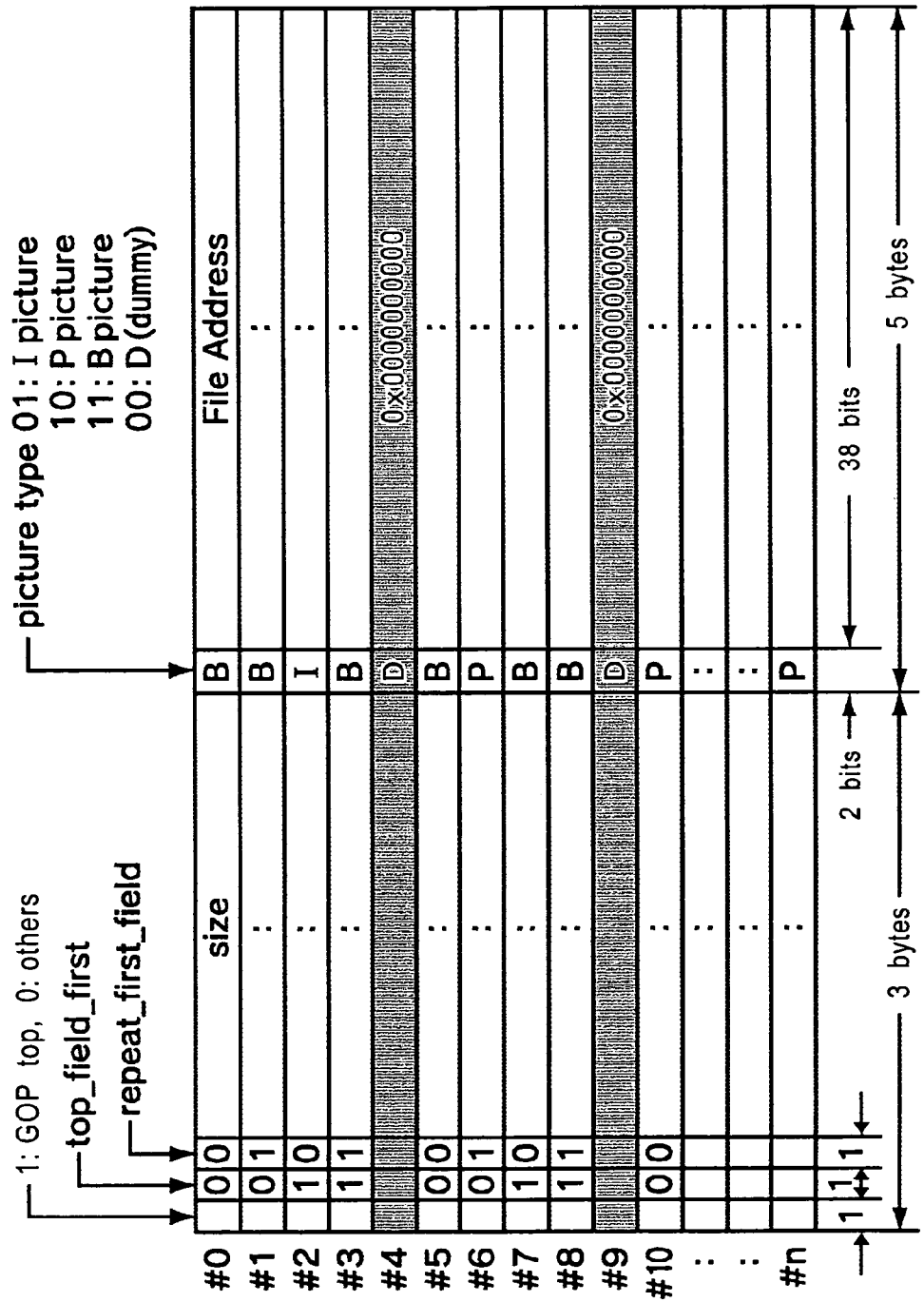
FIG. 5 shows an example of a table.

The video data stream output from the capturing unit 71 is also supplied to the table generating unit 74. The table generating unit 74 generates a table in step S13. The details of this step will be described later with reference to the flowchart shown in FIG. 6, but the table as shown in FIG. 5 is generated in this step. The table includes a plurality of entries, each having a uniform capacity. In the example shown in FIG. 5, each entry has a capacity of 8 bytes.

Information of one frame is recorded in one entry. Accordingly, information of each frame is recorded in a corresponding entry according to a display order.

The information of each frame includes a GOP top flag, a top_field_first flag, and a repeat_first_field flag, each having 1 bit, which are recorded at the top of the entry. Next to the three flags, the size (amount of data) of the frame is recorded in 21 bits. Next to the size, the picture type is described in 2 bits. "Picture type 01" means that the frame is I picture; "picture type 10" means that the frame is P picture; "picture type 11" means that the frame is B picture; and "picture type 00" means that the frame is a dummy frame.

When the GOP top flag is 1, that means the frame is at the top of GOP. On the other hand, when the GOP top flag is 0, the frame is not at the top of GOP.

When the repeat_first_field flag is 1, that means the frame includes a repeat field, and when the repeat_first_field flag is 0, that means the frame does not include a repeat field. The top_field_first flag indicates whether the first field among fields in the frame is a top filed or bottom field. When the top_field_first flag is 1, that means the frame has a structure in which the top field temporally precedes the bottom field, and when the top_field_first flag is 0, that means the frame has a structure in which the bottom field temporally precedes the top field.

Next to the picture type, a file address at the top of the frame (picture) is described in 38 bits.

The table generating unit 74 stores the generated table in an internal memory (specifically, in the RAM 12 shown in FIG. 1).

In step S14, the capturing unit 71 determines whether the stream of one video clip has been captured. If the stream has not been captured, the process returns to step S11, so that the following steps are repeated.

When it is determined that the stream has been captured (recorded) in step S14, the process proceeds to step S15, where the table recording unit 75 records the table on the optical disc 21. That is, the table recording unit 75 reads the table recorded in the table generating unit 74 and records the table on the optical disc 21 through the drive unit 18.

Video data streams recorded by the stream recording unit 73 are sequentially recorded on tracks of the optical disc 21, but tables are collectively recorded in a predetermined area at the innermost radius of the optical disc 21.

Figure 6:
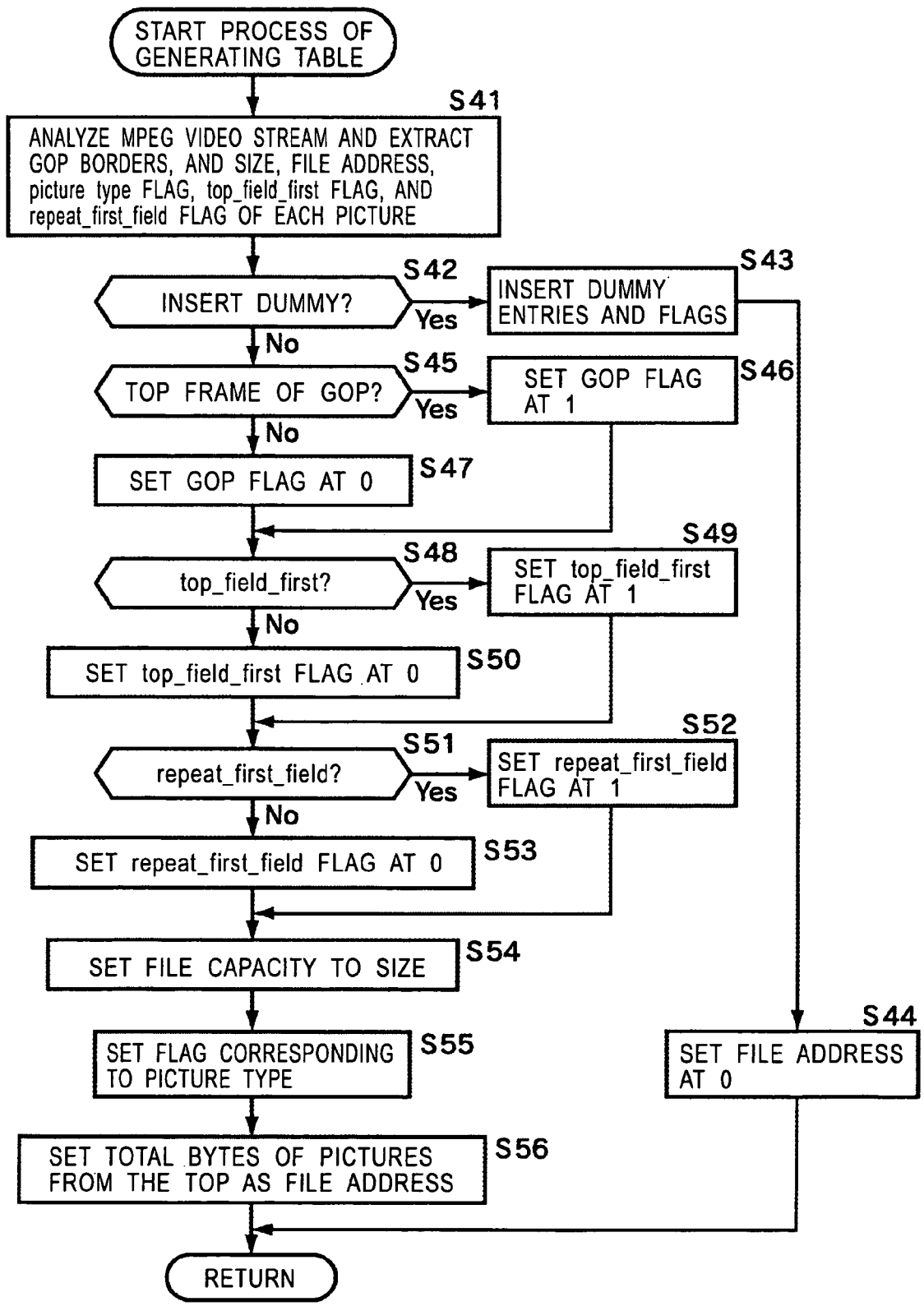
FIG. 6 is a flowchart illustrating a process of generating a table, corresponding to step S13 in FIG. 3.

Next, a process of generating a table, that is, step S13 in FIG. 3, will be described with reference to the flowchart shown in FIG. 6.

In step S41, the table generating unit 74 analyzes the MPEG video stream input from the capturing unit 71, and then extracts borders of GOPs; and size, file address, picture type flag, top_field_first flag, and repeat_first_field flag of each picture. The file address represents the total bytes of the pictures from the top.

In step S42, the table generating unit 74 determines whether dummy entries should be inserted. Dummy frame information is inserted for every four frames when the frame rate of the video data to be recorded is 24 frames/sec. However, dummy frame information is not inserted when the frame rate of the video data to be recorded is 30 frames/sec.

In this way, by inserting a dummy frame for every four frames, information of 6 frames can be inserted to 24 frames. Therefore, frame information of a frame rate of 24 frames/sec can be recorded in units of 30 entries.

When it is determined that dummy entries should be inserted in step S42, the process proceeds to step S43, where the table generating unit 74 inserts dummy entries to the table and also attaches a flag indicating a dummy frame to each dummy entry. In the example shown in FIG. 5, the two bits indicating the picture type is set at 00.

Then, in step S44, the table generating unit 74 describes 0x0000000000 as the file address of each dummy entry.

In the example shown in FIG. 5, dummy frame entries are inserted to the fifth and tenth entries.

When it is determined that dummy entries need not be inserted in step S42, the process proceeds to step S45, where the table generating unit 74 determines whether the frame which is currently being processed is the top frame of GOP. When the frame is the top frame, the process proceeds to step S46, where the table generating unit 74 sets the GOP flag at 1. Otherwise, the process proceeds to step S47, where the table generating unit 74 sets the GOP flag at 0.

After step S46 or S47, the process proceeds to step S48, where the table generating unit 74 determines whether the processed frame is top_field_first. When the processed frame is top_field_first, the process proceeds to step S49, where the table generating unit 74 sets the top_field_first flag at 1. Otherwise, the process proceeds to step S50, where the flag is set at 0.

After step S49 or S50, the process proceeds to step S51, where the table generating unit 74 determines whether the processed frame is repeat_first_field. When the processed frame is repeat_first_field, the process proceeds to step S52, where the table generating unit 74 sets the repeat_first_field flag at 1. Otherwise, the process proceeds to step S53, where the flag is set at 0.

After step S52 or S53, the process proceeds to step S54, where the table generating unit 74 sets the data amount of the frame to size. Then, in step S55, the table generating unit 74 sets a flag corresponding to the picture type. That is, 01 is set when the picture type of the frame is I picture, 10 for P picture, and 11 for B picture.

In step S56, the table generating unit 74 sets the total bytes of pictures from the top as a file address.

The above-described process is performed for each frame.

The process of recording video data which has been encoded by the MPEG method has been described above. Next, a recording process performed when a video signal which is not encoded is input will be described with reference to the flowchart shown in FIG. 7.

In step S71, when a video signal is input, the capturing unit 71 A/D-converts the signal and supplies it to the encoding unit 72. The encoding unit 72 encodes the input video data by the MPEG method in step S72. Accordingly, the above-described GOP borders; and size, file address, picture type flag, top_field_first flag, and repeat_first_field flag of each picture are adequately generated.

In step S73, the table generating unit 74 generates a table based on the GOP borders; and size, file address, picture type flag, top_field_first flag, and repeat_first_field flag of each picture, which have been generated by the process of the encoding unit 72 in step S72. This step (step S73) will be described later with reference to the flowchart shown in FIG. 8.

Then, in step S74, the stream recording unit 73 supplies the MPEG video stream encoded by the encoding unit 72 to the optical disc 21 through the drive unit 18, so as to record the video stream on the optical disc 21.

In step S75, the capturing unit 71 determines whether the video signal of one video clip has been captured. When it is determined that the video signal has not been captured, the process returns to step S71 so as to repeat the following steps.

When it is determined that the video signal has been captured in step S75, the process proceeds to step S76, where the table generating unit 74 supplies the table generated in step S73 to the table recording unit 75, so that the table is recorded on the optical disc 21 through the drive unit 18.

Figure 7:
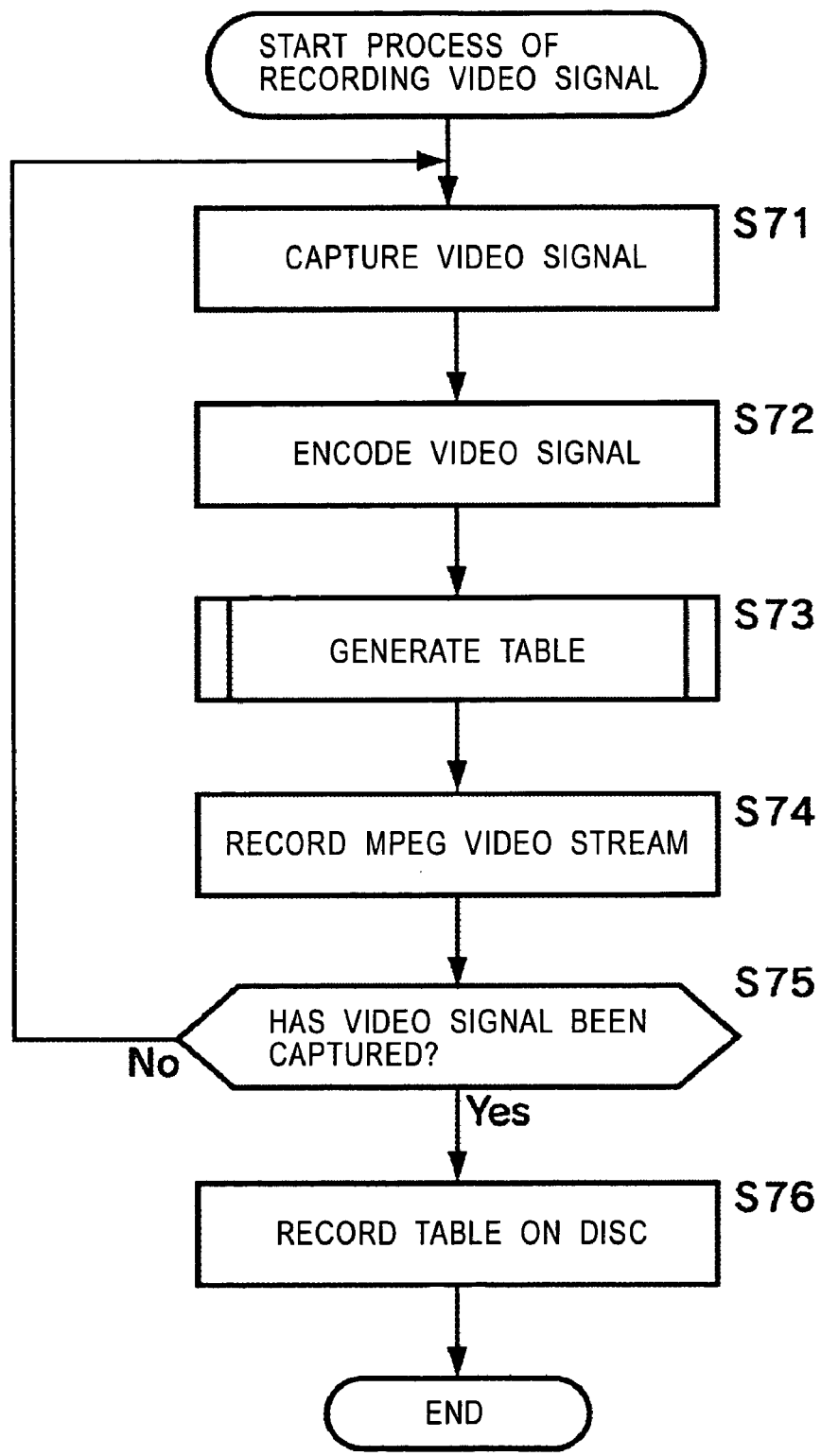
FIG. 7 is a flowchart illustrating a process of recording a video signal in the disc recording/playback apparatus shown in FIG. 2.
Figure 8:
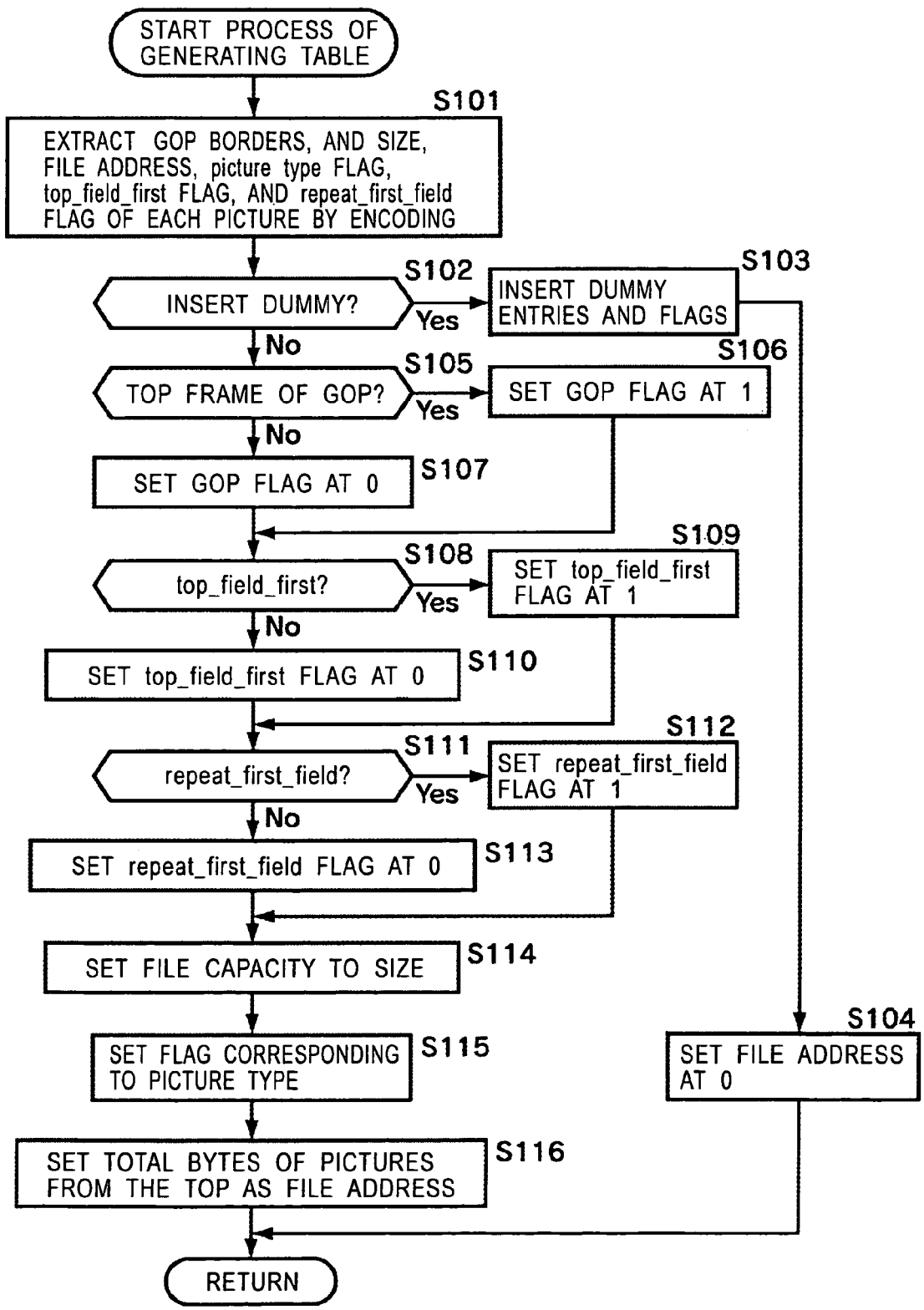
FIG. 8 is a flowchart illustrating a process of generating a table, corresponding to step S73 in FIG. 7.

FIG. 8 shows a process of generating a table, that is, step S73 of the flowchart shown in FIG. 7. In FIG. 8, steps S101 to S116 are basically the same as steps S41 to S56 in FIG. 6. However, step S101, which corresponds to step S41, is different from step S41. That is, in step S41 in FIG. 6, the input video data has already been encoded by the MPEG method, and thus GOP borders; and size, file address, picture type flag, top_field_first flag, and repeat_first_field flag of each picture can be extracted by analyzing the video data stream.

On the other hand, in step S101 in FIG. 8, the input video signal has not been encoded yet by the MPEG method. Since the video signal is encoded by the encoding unit 72, those pieces of information are extracted from the information supplied from the encoding unit 72. The other steps are the same as in FIG. 6, and thus the corresponding description will be omitted.

Figure 9:
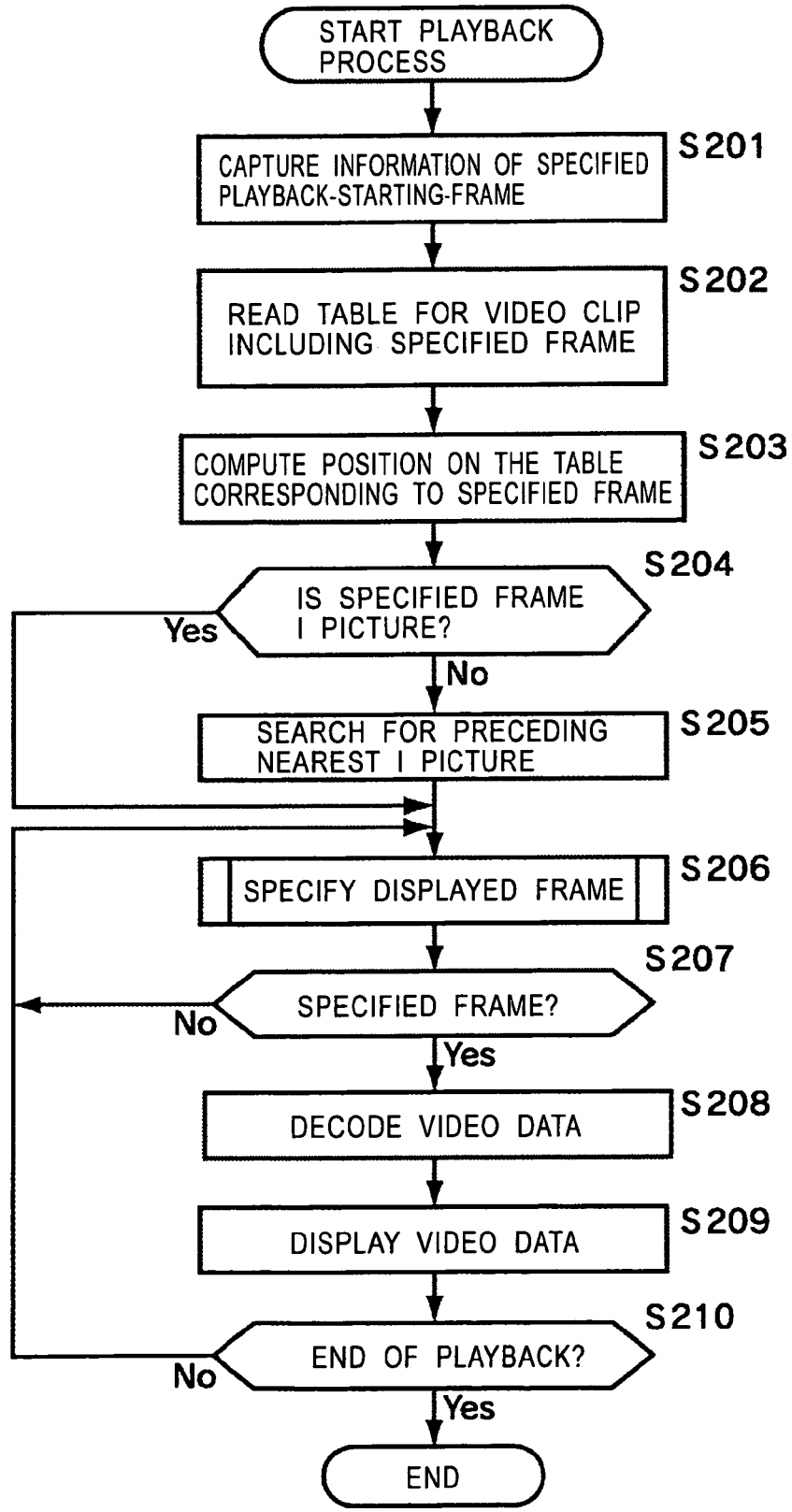
FIG. 9 is a flowchart illustrating a process of playing back video data in the disc recording/playback apparatus shown in FIG. 2.

Next, a process of playing back the video data recorded in this way on the optical disc 21 will be described with reference to the flowchart shown in FIG. 9.

This process is started when the user inputs a command of starting playback from a predetermined frame through the input unit 19.

In step S201, the playback unit 76 captures information about a playback-starting-frame specified by the user. The information is, for example, a frame number.

In step S202, the playback unit 76 reads a table for the video clip including the specified frame from the optical disc 21. That is, the playback unit 76 reads the table from the optical disc 21 through the drive unit 18 and supplies the table to the computing unit 77. Then, in step S203, the computing unit 77 computes the position on the table corresponding to the specified frame. That is, as described above with reference to FIG. 5, information of one frame is described in one entry, and the capacity of each entry is uniform. Therefore, by multiplying the capacity of the entry by the frame number, the position on the table of the specified frame can be found. Specifically, in the example shown in FIG. 5, one entry has 8 bytes. Therefore, when the frame number is N, the position of the entry (frame) can be found by computing 8×N.

Alternatively, numbers may be sequentially recorded in the entries of the table, so that an entry (frame) can be searched for based on the numbers. In this method, however, long time is required for search. Therefore, in order to access the entry (frame) more quickly, the capacity of each entry is made uniform and the capacity and a frame number are multiplied so as to compute the position of the entry. Then, the position found by the computation is searched for.

The search unit 78 reads information of the entry computed by the computing unit 77 and determines whether the frame (specified frame) is I picture. The determination can be achieved based on the picture type of the entry (frame). That is, when the picture type is 01, the frame is I picture. If the specified frame is not I picture, the process proceeds to step S205, where the search unit 78 searches for the preceding nearest I picture on the table. That is, if the specified playback-starting-frame is not I picture (P picture or B picture), a decoding process can only be performed by returning to the preceding nearest I picture, because the video data of that frame is generated by interframe prediction. For this reason, the preceding nearest I picture is searched for.

When the specified frame is determined to be I picture in step S204, decoding can be started from that frame. In this case, step S205 is skipped.

For example, as shown in FIG. 10, if the specified frame is a frame No. 8 (ninth frame in the playback order), the picture is not I picture but is P picture. Therefore, in the example shown in FIG. 10, the preceding nearest I picture, that is, a frame No. 2 is searched for. The search unit 78 supplies information about the position on the table of the searched I picture to the displayed-frame specifying unit 79.

In step S206, the displayed-frame specifying unit 79 specifies the frame to be displayed. That is, the displayed-frame specifying unit 79 performs a corresponding process based on the three flags: top_field_first; repeat_first_field; and picture type, as shown in FIG. 11. In the example shown in FIG. 11, when the values of top_field_first and repeat_first_field are 00 or 10, a frame made by combining the top field and bottom field of the picture indicated by the file address of the entry in the table is displayed. On the other hand, when the values of top_field_first and repeat_first_field are 01 or 11, a frame made by combining the top field of the picture indicated by the file address of the immediately preceding entry in the table and the bottom field of the picture indicated by the file address of the entry in the table is displayed.

Further, when the picture type indicates a dummy (00), a frame made by combining the top field and bottom field of the picture indicated by the file address of the immediately preceding entry in the table is displayed.

Figure 12:
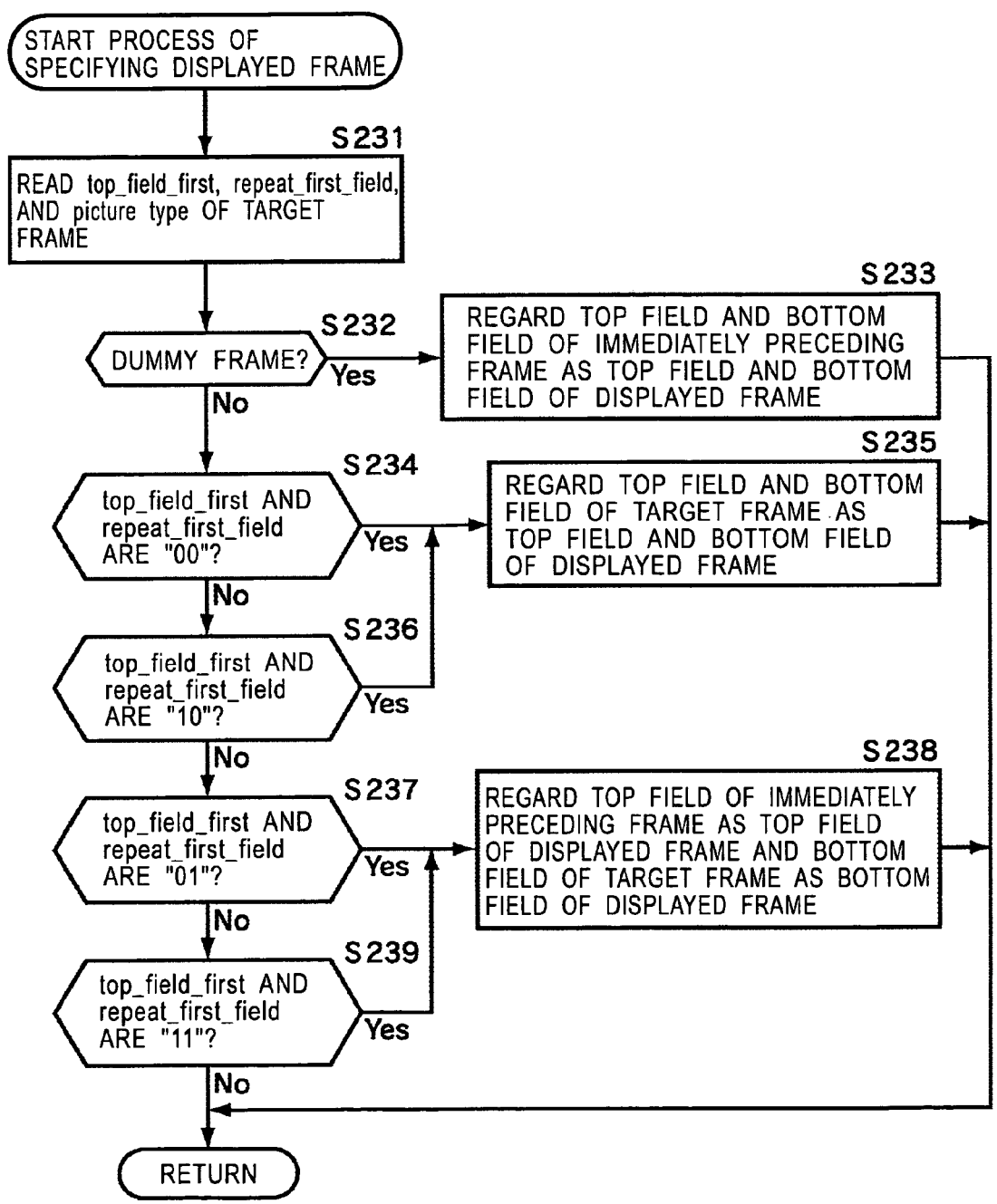
FIG. 12 is a flowchart illustrating a process of specifying a frame to be displayed.

The details of this process of specifying a displayed frame is shown in the flowchart in FIG. 12. Hereinafter, this process will be described with reference to the flowchart in FIG. 12. In step S231, the displayed-frame specifying unit 79 reads top_field_first, repeat_first_field, and the picture type of the target frame from the table. Then, in step S232, the displayed-frame specifying unit 79 determines whether the frame of the currently processed entry is a dummy frame. Specifically, it is determined whether the picture type of the frame (entry) is 00. If the target frame is a dummy frame (if the picture type is 00), the process proceeds to step S233, where the displayed-frame specifying unit 79 regards the top field of the immediately preceding frame as the top field of the displayed frame and regards the bottom field of the immediately preceding frame as the bottom field of the displayed frame.

On the other hand, when the target frame (entry) is determined not to be a dummy frame in step S232, the displayed-frame specifying unit 79 determines whether top_field_first and repeat_first_field are 00, 10, 01, or 11 in steps S234, S236, S237, or S239. When top_field_first and repeat_first_field are determined to be 00 or 10, the process proceeds to step S235, where the displayed-frame specifying unit 79 regards the top field and bottom field of the target frame as the top field and bottom field of the displayed frame.

On the other hand, when top_field_first and repeat_first_field are 01 or 11, the process proceeds to step S238, where the displayed-frame specifying unit 79 regards the top field of the immediately preceding frame as the top field of the displayed frame and regards the bottom field of the target frame as the bottom field of the displayed frame.

FIG. 13 shows a specific example of the above-described process. In this figure, the upper five rows show a table and the lower two rows show frames generated as frames to be displayed. In frame 1, top_field_first and repeat_first_field are 00, and the frame (picture) recorded on the disc is frame A. Therefore, the top field and bottom field of frame A form a frame to be played back.

In frame 2, top_field_first and repeat_first_field are 0.10, and the recorded frame is frame B. Therefore, the top field and bottom field of frame B form a frame to be played back.

In frame 3, top_field_first and repeat_first_field are 01, and the recorded frame is frame C. Therefore, the top field of the immediately preceding frame B and the bottom field of frame C form a frame to be played back.

In frame 4, top_field_first and repeat_first_field are 11, and the recorded frame is frame D. Therefore, the top field of the immediately preceding frame C and the bottom field of frame D form a frame to be played back.

Frame 5 is a dummy frame. Therefore, the top field and bottom field of the immediately preceding frame D form a frame to be played back.

In FIG. 13, the frames recorded on the disc have a frame rate of 24 frames/sec. However, when the frame rate is 30 frames/sec, top_field_first and repeat_first_field are 00. In this case, the top field and bottom field of the frame form a frame to be played back.

Returning to FIG. 9, after the frame to be displayed has been specified in step S206, the displayed-frame specifying unit 79 determines whether the frame which is currently being processed is the specified frame in step S207. For example, the specified frame in the example in FIG. 10 is the frame No. 8. Since decoding must be started from I picture, decoding is performed in order from the frame No. 2. However, frames No. 2 to No. 7 need not be output. Accordingly, in this case, it is determined that the frame which is currently being processed is not the specified frame in step S207 so as to return to step S206, and a process of specifying a displayed frame is performed for the next frame.

These steps are repeated, and when the target frame is determined to be the specified frame in step S207, the process proceeds to step S208, where the decoding unit 80 decodes the video data of the specified frame. Then, in step S209, the display unit 81 outputs the video data decoded in step S208 to the display through the video display/output unit 17 so as to display the video data.

In step S210, the playback unit 76 determines whether end of playback has been instructed. If end of playback has not been instructed, the process returns to step S206 and the following steps are repeated.

If it is determined that end of playback has been instructed in step S210, the process is completed.

In the above-described example, "picture type 00" indicates dummy data. Alternatively, a dedicated flag indicating a dummy picture may be provided as shown in FIG. 14. In that case, the value "1" indicates the frame is a dummy frame, and the value "0" indicates the frame is not a dummy frame.

Next, processing of table performed when a video clip is edited will be described.

Figures 15A, 15B:
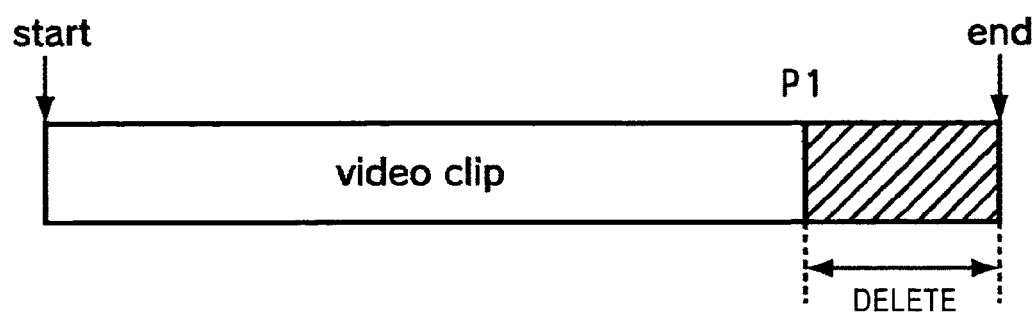
FIGS. 15A and 15B illustrate deletion of the table.

As shown in FIG. 15A, if a portion between point P1 and the end of a video clip is deleted, a portion between point L1 corresponding to point P1 and the end of the table is also deleted, as shown in FIG. 15B.

Figure 16A:
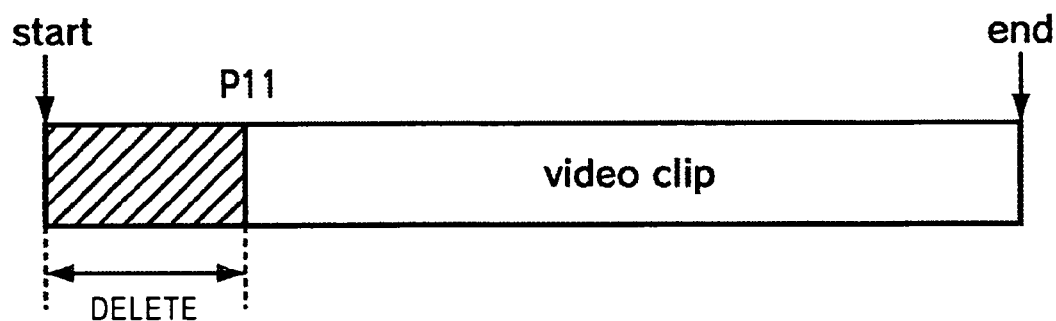
FIGS. 16A and 16B illustrate deletion of the table.
Figure 16B:
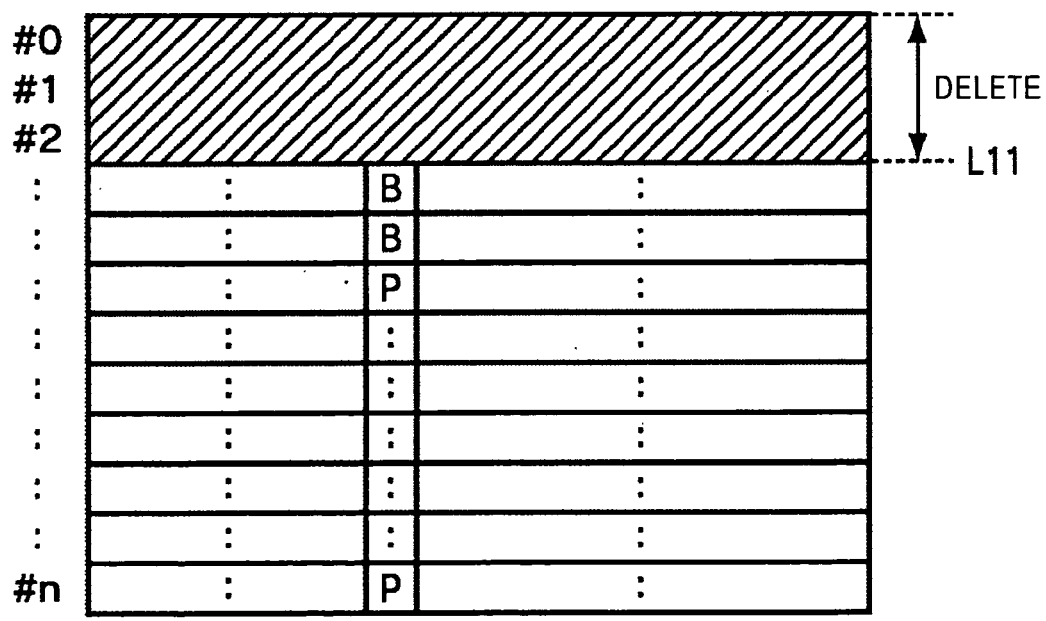

Likewise, as shown in FIG. 16A, if a portion between the start and point P11 of a video clip is deleted, a portion between the start and point L11 corresponding to point P11 is also deleted in the table, as shown in FIG. 16B.

If the end portion of the table is deleted as shown in FIG. 15B, no problems occur. However, if the head portion of the table has been deleted as shown in FIG. 16B, values of file addresses described in the table no longer correspond to the addresses of frames in the video clip, because each of the values of file addresses described in the table indicates the relative position of a frame from the top of the video clip before deletion.

In order to solve this problem, in the present invention, a value obtained by subtracting an offset value from the value of a file address on the table is used as a file address for searching for a file in a video clip. The offset value is 0 before the head portion of the table is deleted. On the other hand, if the head portion of the table has been deleted, the last value of the deleted portion is set as the offset value. By regarding a file address described in the table as "File Address" and the offset value as "File Address Offset", "Address" expressed by the following expression always corresponds to a file in the video clip:

Address=File Address−File Address Offset.

Figure 17A:
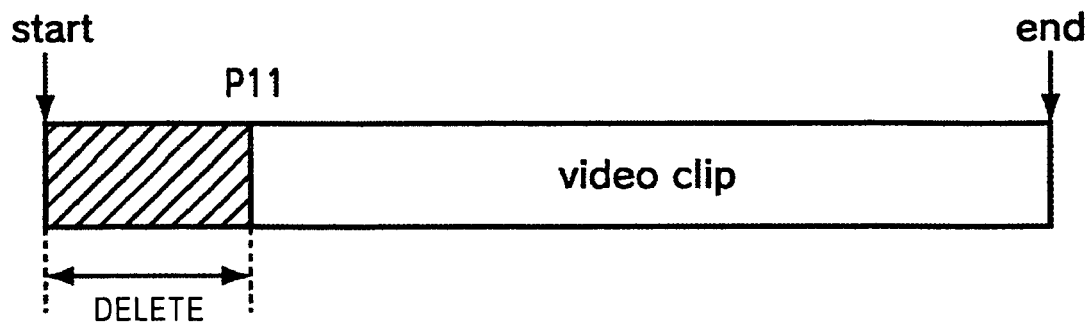
FIGS. 17A-17C illustrate deletion of the table.
Figure 17B:
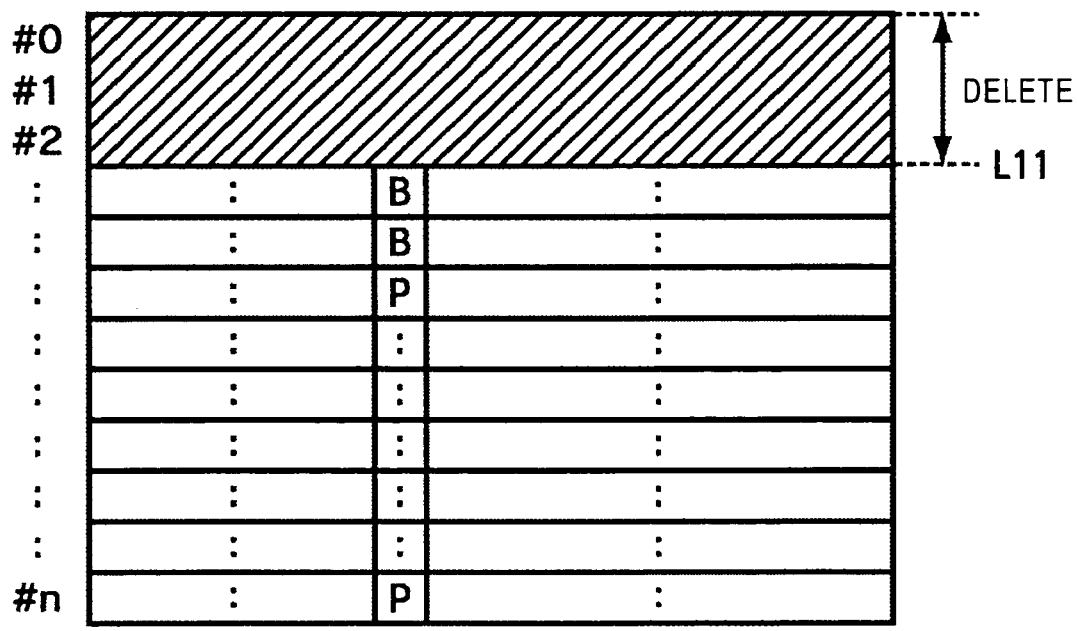
Figure 17C:

Accordingly, in the present invention, if the head portion of the video clip shown in FIG. 17A is deleted and the corresponding head portion of the table is deleted as shown in FIG. 17B, the offset value (File Address Offset) corresponding to the deleted portion is recorded on the optical disc 21 as part of the table, as shown in FIG. 17C. Accordingly, a specific file on the video clip can be accurately specified by using the offset value.

Figure 18A:
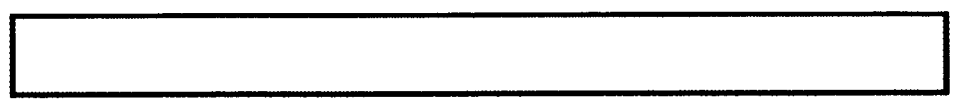
FIGS. 18A and 18B illustrate deletion of the video clip.
Figure 18B:
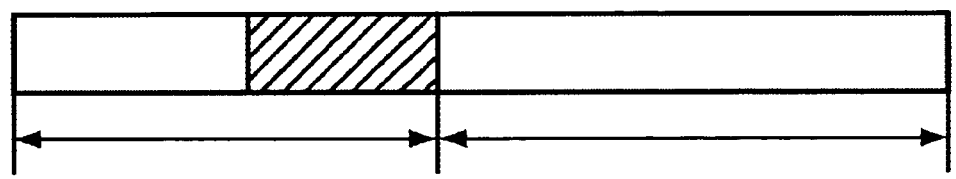

For example, if the portion between points P21 and P22 of the video clip shown in FIG. 18A is deleted as shown in FIG. 18B, the video clip is divided into two portions: a portion between the start point and point P22 and a portion between point P22 and the end.

Figure 19A:
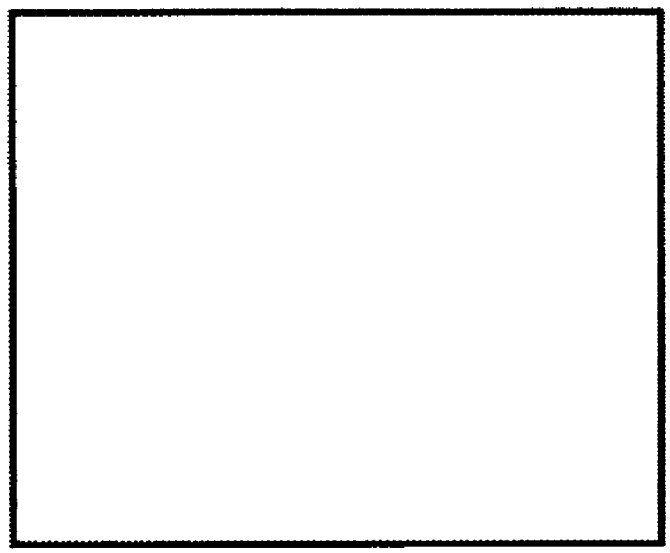
FIGS. 19A and 19B illustrate deletion of the table.
Figure 19B:
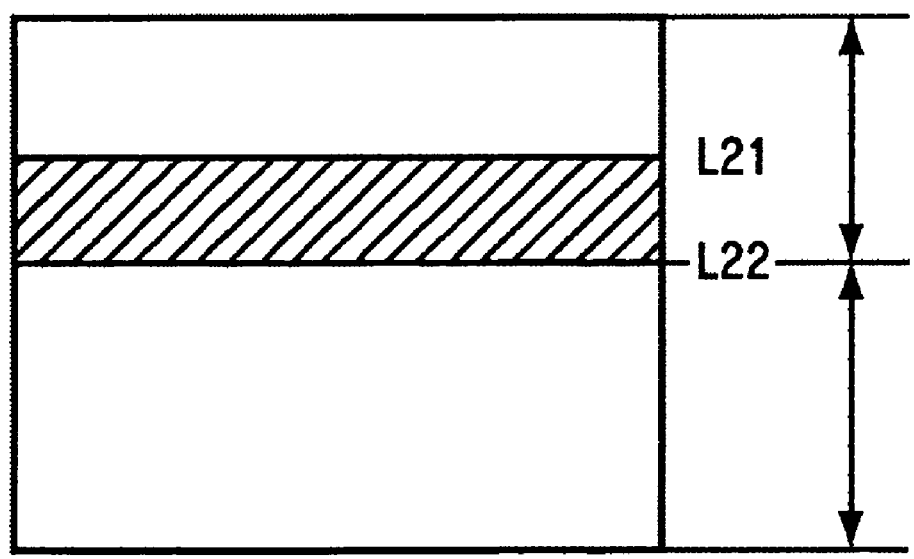

As a result, as shown in FIG. 19A, in a table corresponding to the video clip before being divided (FIG. 18A), a portion between points L21 and L22 of the table corresponding to the portion between points P21 and P22 of the video clip is deleted, as shown in FIG. 19B. As a result, the table is divided into two portions: a portion between the head and point L22 and a portion between point L22 and the end. In the portion between point L22 and the end of the table, the offset value is set as L22. Therefore, the position of each frame can be accurately searched for in the table.

In the above-described embodiment, a video signal is compressed by the MPEG method. However, the present invention can be applied when the video signal is encoded by another method.

Although the disc recording/playback apparatus 11 includes both of the recording system 51 and the playback system 52, the present invention can be applied to a disc apparatus including one of the recording system and playback system so that only one of recording and playback can be performed.

Of course, discs other than an optical disc may be used, for example, a magnetic disc and a magneto-optical disc.

The above-described series of processes may be executed by any of hardware and software. When the series of processes are executed by software, a program constituting the software is installed through a network or recording medium to a computer incorporated in dedicated hardware or a multi-purpose personal computer which can perform various functions by installing various programs therein.

The recording medium may be the removable medium 41 shown in FIG. 1, which contains a program and which is distributed for providing the program to a user, such as a magnetic disc (including a floppy disc), an optical disc (including a CD-ROM and a DVD), a magneto-optical disc (including an MD), or a semiconductor memory. Alternatively, a built-in ROM or hard disk containing the program may be used.

In this specification, steps in a program recorded in a recording medium may be performed in time series according to the described order, or may be performed in parallel or independently.

Also, in this specification, a system means an entire apparatus including a plurality of devices.

What is claimed is:

1. A disc apparatus for recording encoded video data on a disc, comprising:
    determining means for determining, for each frame of the video data, whether the first field of the frame is a top field, whether the frame includes a repeat field, and whether the frame is a dummy frame;
    generating means for generating a table based on the determination result from the determining means, the table including pieces of identification information of each frame: identification information indicating whether the first field of the frame is a top field, identification information indicating whether the frame includes a repeat field, and identification information indicating whether the frame is a dummy frame; and
    recording means for recording the generated table on the disc.

2. A disc apparatus according to claim 1,
    wherein the determining means also determines the type of encoding of the frame, and
    the generating means describes identification information indicating the type of encoding of the frame in the table.

3. A disc apparatus according to claim 2,
    wherein the unit of the encoding is a long Group Of Pictures,
    the identification information indicating whether the first field of the frame is a top field is top_field_first,
    the identification information indicating whether the frame includes a repeat field is repeat_first_field, and
    the type of encoding of the frame includes I picture, P picture, and B picture.

4. A disc apparatus according to claim 1, wherein the generating means describes an address indicating the position on the disc of the frame in the table.

5. A disc apparatus according to claim 1, wherein the generating means allocates a uniform size of entry of the table to each frame, and describes the identification information of each frame in the entries of the table according to a display order.

6. A disc apparatus according to claim 1,
    wherein the generating means generates the table for each unit of recording including sequential pieces of the video data, and
    when part of the video data is deleted, the generating means deletes part of the table corresponding to the deleted part of the video data.

7. A disc apparatus according to claim 6,
    wherein the generating means also generates an offset value indicating a position from the top of the table, and
    the recording means records the offset value on the disc.

8. A disc recording method for recording encoded video data on a disc, comprising:
    a determining step of determining, for each frame of the video data, whether the first field of the frame is a top field, whether the frame includes a repeat field, and whether the frame is a dummy frame;
    a generating step of generating a table based on the determination result obtained in the determining step, the table including pieces of identification information of each frame: identification information indicating whether the first field of the frame is a top field, identification information indicating whether the frame includes a repeat field, and identification information indicating whether the frame is a dummy frame; and
    a recording step of recording the generated table on the disc.

9. A computer-readable medium storing a computer-readable program for recording encoded video data on a disc, the program comprising:
    a determining step of determining, for each frame of the video data, whether the first field of the frame is a top field, whether the frame includes a repeat field, and whether the frame is a dummy frame;
    a generating step of generating a table based on the determination result obtained in the determining step, the table including pieces of identification information of each frame: identification information indicating whether the first field of the frame is a top field, identification information indicating whether the frame includes a repeat field, and identification information indicating whether the frame is a dummy frame; and
    a recording step of recording the generated table on the disc.

10. A disc apparatus for playing back encoded video data recorded on a disc, comprising:
    playback means for playing back the video data and a table from the disc, the table including pieces of identification information of each frame of the video data:
    identification information indicating whether the first field of the frame is a top field, identification information indicating whether the frame includes a repeat field, and identification information indicating whether the frame is a dummy frame;
    frame generating means for generating a frame to be displayed based on the identification information in the played back table; and
    output means for decoding video data of the generated frame and outputting the video data.

11. A disc apparatus according to claim 10, wherein identification information indicating the type of encoding of the frame is described in the table.

12. A disc apparatus according to claim 11,
    wherein the unit of the encoding is a long Group Of Pictures,
    the identification information indicating whether the first field of the frame is a top field is top_field_first,
    the identification information indicating whether the frame includes a repeat field is repeat_first_field, and
    the identification information indicating the type of encoding of the frame is a signal for identifying the frame as I picture, P picture, or B picture.

13. A disc apparatus according to claim 12, further comprising:
    searching means for determining the type of a specified playback-starting-frame based on the identification information indicating the type of encoding of the frame, and, when the specified playback-starting-frame is not I picture, searching for the temporally preceding nearest I picture,
    wherein the output means starts decoding from the searched I picture and outputs the video data from the specified frame.

14. A disc apparatus according to claim 10, wherein an address indicating the position on the disc of the frame is described in the table.

15. A disc apparatus according to claim 10,
wherein the identification information of each frame is described in the table in accordance with a display order, and
the searching means computes the position on the table of the specified frame based on the size of an entry of the table allocated to the frame and a specified-frame number.

16. A disc apparatus according to claim 15,
wherein an offset value indicating a position from the top of the table is described in the table, and
the searching means computes the position on the table of the specified frame by using the offset value.

17. A disc playback method for playing back encoded video data recorded on a disc, comprising:
a playback step of playing back the video data and a table from the disc, the table including pieces of identification information of each frame of the video data:
identification information indicating whether the first field of the frame is a top field, identification information indicating whether the frame includes a repeat field, and identification information indicating whether the frame is a dummy frame;
a frame generating step of generating a frame to be displayed based on the identification information in the played back table; and
an output step of decoding video data of the generated frame and outputting the video data.

18. A computer-readable medium storing a computer-readable program for playing back encoded video data recorded on a disc, the program comprising:
a playback step of playing back the video data and a table from the disc, the table including pieces of identification information of each frame of the video data: identification information indicating whether the first field of the frame is a top field, identification information indicating whether the frame includes a repeat field, and identification information indicating whether the frame is a dummy frame;
a frame generating step of generating a frame to be displayed based on the identification information in the played back table; and
an output step of decoding video data of the generated frame and outputting the video data.

\* \* \* \* \*